US012750649B2

(12) United States Patent
Gilliam

(10) Patent No.: US 12,750,649 B2
(45) Date of Patent: Sep. 29, 2026

(54) SITE SAFETY SYSTEM

(71) Applicant: iC5ISR LLC, Bossier City, LA (US)

(72) Inventor: Michael Jay Gilliam, Shreveport, LA (US)

(73) Assignee: iC5ISR LLC

( * ) Notice: Subject to any disclaimer, the term of this patent is extended or adjusted under 35 U.S.C. 154(b) by 820 days.

(21) Appl. No.: 17/463,549

(22) Filed: Sep. 1, 2021

(65) Prior Publication Data

US 2022/0312168 A1 Sep. 29, 2022

Related U.S. Application Data

(60) Provisional application No. 63/167,003, filed on Mar. 27, 2021.

(51) Int. Cl.

| | |
|---|---|
| ***H04W 4/90*** | (2018.01) |
| ***E05B 49/00*** | (2006.01) |
| ***G07C 9/00*** | (2020.01) |
| ***H04B 7/06*** | (2006.01) |
| ***H04B 7/26*** | (2006.01) |
| ***H04W 4/029*** | (2018.01) |

(52) U.S. Cl.

CPC ............... *H04W 4/90* (2018.02); *E05B 49/00* (2013.01); *G07C 9/00309* (2013.01); *G07C 9/00904* (2013.01); *H04B 7/0608* (2013.01); *H04B 7/2628* (2013.01); *H04W 4/029* (2018.02); *G07C 2009/00515* (2013.01)

(58) Field of Classification Search

None

See application file for complete search history.

(56) References Cited

U.S. PATENT DOCUMENTS

2022/0078238 A1* 3/2022 Nixon ................ G05B 19/4185
2024/0080219 A1* 3/2024 Park .................... H04L 12/2832

FOREIGN PATENT DOCUMENTS

TW 408541 B * 10/2000 .......... H04W 52/265

* cited by examiner

*Primary Examiner* — Adolf Dsouza

(74) *Attorney, Agent, or Firm* — AEON Law, PLLC; Adam L.K. Philipp; Charlotte E. Holoubek

(57) ABSTRACT

A site safety system comprising an onsite command center server including a command center processor coupled to a command center system bus, a command center memory coupled to the command center system bus, the command center memory being a non-transitory machine-readable storage medium configured to store instructions for execution by the command center processor, and a command center communication interface coupled to the command center system bus, a first sensor and a second sensor spaced from one another and communicatively connected to the onsite command center server, and a multi-mode data logger communicatively connected to the onsite command center server.

17 Claims, 6 Drawing Sheets

SITE SAFETY SYSTEM

CROSS REFERENCE TO RELATED APPLICATIONS/PRIORITY

The present invention claims priority to U.S. Provisional Patent Application No. 63/167,003 filed Mar. 27, 2021, which is incorporated by reference into the present disclosure as if fully restated herein. Any conflict between the incorporated material and the specific teachings of this disclosure shall be resolved in favor of the latter. Likewise, any conflict between an art-understood definition of a word or phrase and a definition of the word or phrase as specifically taught in this disclosure shall be resolved in favor of the latter.

TECHNICAL FIELD

The present disclosure relates, generally, to a safety and communication system. More particularly, the present disclosure relates to a site safety system.

BACKGROUND

Many individuals, such as teachers, parents, workers, managers, employers, and organizations, such as schools and businesses often find it useful to communicate during an emergency such as a fire, severe weather, a school shooting, or an act of terrorism. The organizations are finding it increasingly difficult to detect a potential threat that may cause an emergency and maintain a desired level of communication during the emergency. Additionally, coordinating a quick response among decision makers and security personnel of the organization is difficult. Some of the main problems that hamper efforts to communicate during the emergency and to initiate a response to the emergency are that there are often many different people that should be alerted during the emergency. Also, the time taken to alert various people during an emergency before a tragic event occurs is often more than desirable.

Accordingly, there is a need for systems and methods that can detect the potential threat and communicate the potential threat to different users within acceptable constraints of time.

SUMMARY

The present disclosure provides a site safety system for active and automated triggering of active threats, based on artificial intelligence, remote networked triaxial accelerometers (with pre-programmed wave data decision tree triggering—automobile, human waveforms), networked video/audio monitoring, and programmable data logger that processes and filters trigger data. Additionally, the site safety system live streams video and audio feed to users and communicates read only feed including threat data to the users for enhancing users' situational awareness. Additionally, the site safety system provides push notification to the users. The push notifications may include pick-up points, location status, and emergency information. Further, pre-programmed building diagrams, casualty collection points, first aid stations, rally points, safe exit lanes, and other user created tools may be actively rendered on cloud, web, VPN, or other customer networks to the users.

The presently disclosed invention relates to methods and site safety systems comprising an onsite command center server including a command center processor coupled to a command center system bus, a command center memory coupled to the command center system bus, the command center memory being a non-transitory machine-readable storage medium configured to store instructions for execution by the command center processor, and a command center communication interface coupled to the command center system bus, a first sensor and a second sensor spaced from one another and communicatively connected to the command center server, a multi-mode data logger communicatively connected to the command center server including a data input receiving data from the command center server, a first data output and a second data output, being the default route for sending data from the data input to a data output, a multi-mode data logger processor coupled to a multi-mode data logger system bus, a multi-mode data logger memory coupled to the multi-mode data logger system bus, the multi-mode data logger memory being a non-transitory machine-readable storage medium configured to store instructions for execution by the multi-mode data logger processor, the data path memory containing instructions causing the processor to monitor available bandwidth via the first data output and the second data output, and when a bandwidth required to transmit data received from the data input exceeds the available bandwidth via the first data output, switch the route for sending data from the data input to the second data output, a first data transmitter communicatively connected to the first data output, and a second data transmitter communicatively connected to the second data output. According to a further embodiment, the system further comprises a first remote powered lock communicatively connected to the command center server. According to a further embodiment, the first sensor is a video camera in a first location and the second sensor is video camera in a second location out of eyesight of the first location. According to a further embodiment, the first location is an entrance to the building. According to a further embodiment, the second location is an interior door in the building providing access to a room. According to a further embodiment, the room is a classroom. According to a further embodiment, the system further comprises a third sensor communicatively connected to the command center server, wherein the third sensor is a microphone. According to a further embodiment, the multi-mode data logger further comprises a third data output, a fourth data output, and the multi-mode data logger memory further containing instructions causing the processor to monitor available bandwidth via the third data output and the fourth data output, and when the bandwidth required to transmit data received from the data input exceeds the available bandwidth via the second data output, switch the route for sending data from the data input to the third data output, and when a bandwidth required to transmit data received from the data input exceeds the available bandwidth via the third data output, switch the route for sending data from the data input to the fourth data output. According to a further embodiment, the first data output is one of a first cellular output and a landline, the second data output is one of the first cellular output, a second cellular output, and the landline, the third data output is one of the second cellular output and the landline, and the fourth data output is one of a FM spread spectrum output and a satellite communications output. According to a further embodiment, the first cellular output is communicatively connected to an omnidirectional antenna, the second cellular output is communicatively connected to a directional antenna, the landline output is communicatively connected to a wired data connection that extends off the building premises, the FM spread spectrum output is communicatively connected to a spread spectrum radio and the satellite communications output is communicatively connected to a SATCOM transceiver. According to a further embodiment, the omnidirectional antenna is one of a batwing antenna, a biconical antenna, a cage aerial, a choke ring antenna, a coaxial antenna, a crossed field antenna, a dielectric resonator antenna, a dipole antenna, a discone antenna, a folded unipole antenna, a franklin antenna, a ground-plane antenna, a halo antenna, a helical antenna, a j-pole antenna, a mast radiator, a monopole antenna, a random wire antenna, a rubber ducky antenna, a turnstile antenna, a t2fd antenna, a t-antenna, an umbrella antenna, and a whip antenna. According to a further embodiment, the directional antenna is one of an adcock antenna, an AS-2259 antenna, an AWX antenna, a beverage antenna, a cantenna, a cassegrain antenna, a collinear antenna, an array conformal antenna, a corner reflector antenna, a curtain array, dipole antenna, a folded inverted conformal antenna, a fractal antenna, a G5RV antenna, a gizmotchy, a helical antenna, a horn antenna, an inverted-F antenna, an inverted vee antenna, a log-periodic antenna, a loop antenna, a microstrip antenna, a moxon antenna, a offset dish antenna, a patch antenna, a phased array, a planar array, a parabolic antenna, a plasma antenna, a quad antenna, a reflective array antenna, a regenerative loop antenna, a rhombic antenna, a sector antenna, a short backfire antenna, a sloper antenna, a slot antenna, a sterba antenna, a vivaldi antenna, a WokFi, and a Yagi-Uda antenna. According to a further embodiment, the directional antenna is directed at a cellular tower that is not the closest cellular tower to the building.

The presently disclosed invention is further related to systems and methods for aiding in site safety comprising (a) monitoring a status of multiple trigger devices at a site, wherein the trigger devices include one or more sensors, (b) when a first trigger device interprets a threat sending a threat notification from the first trigger device to a command control server, and (c) after the treat is confirmed, a command control server processor sending threat information via a multi-mode data logger to a first responder, (d) wherein the multi-mode data logger (i) monitors, via a multi-mode data logger processor, an available bandwidth for each of a first, a second, a third, and a fourth data path, (ii) receives data from the command control server through a data input at a given bandwidth requirement, (iii) when the available bandwidth for the first data path is at least as large as the bandwidth requirement, the processor sends the received data through the first data path, (iv) when the available bandwidth for the first data path is at smaller than the bandwidth requirement, and the available bandwidth for the second data path is at least as large as the bandwidth requirement, the processor sends the received data through the second data path, (v) when the available bandwidth for the first and the second data path is at smaller than the bandwidth requirement, and the available bandwidth for the third data path is at least as large as the bandwidth requirement, the processor sends the received data through the third data path, and (vi) when the available bandwidth for the first, the second, and the third data path is at smaller than the bandwidth requirement, the processor sends the received data through the fourth data path. According to a further embodiment, the first cellular output is communicatively connected to an omnidirectional antenna, the second cellular output is communicatively connected to a directional antenna, the landline output is communicatively connected to a wired data connection that extends off the building premises, the FM spread spectrum output is communicatively connected to a spread spectrum radio and the satellite communications output is communicatively connected to a SATCOM transceiver. According to a further embodiment, the method further comprises the command center server processor transmitting instructions to one or more electric powered door locks in proximity to the first trigger device to actuate and lock. According to a further embodiment, the method further comprises the step of the command center server processor issuing push notifications to multiple individuals with are remote from the site but have relatives who are at the site. According to a further embodiment, mobile electronic devices carried by individuals have instructions stored on mobile electronic device memories that cause the mobile electronic devices to act as trigger devices.

The presently disclosed invention is based on the inventor recognizing technical flaws and weaknesses inherent in the current technology, and discloses technical solutions that address and improve on the inherent flaws and weaknesses, and make the system run better.

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION

Figure 1:
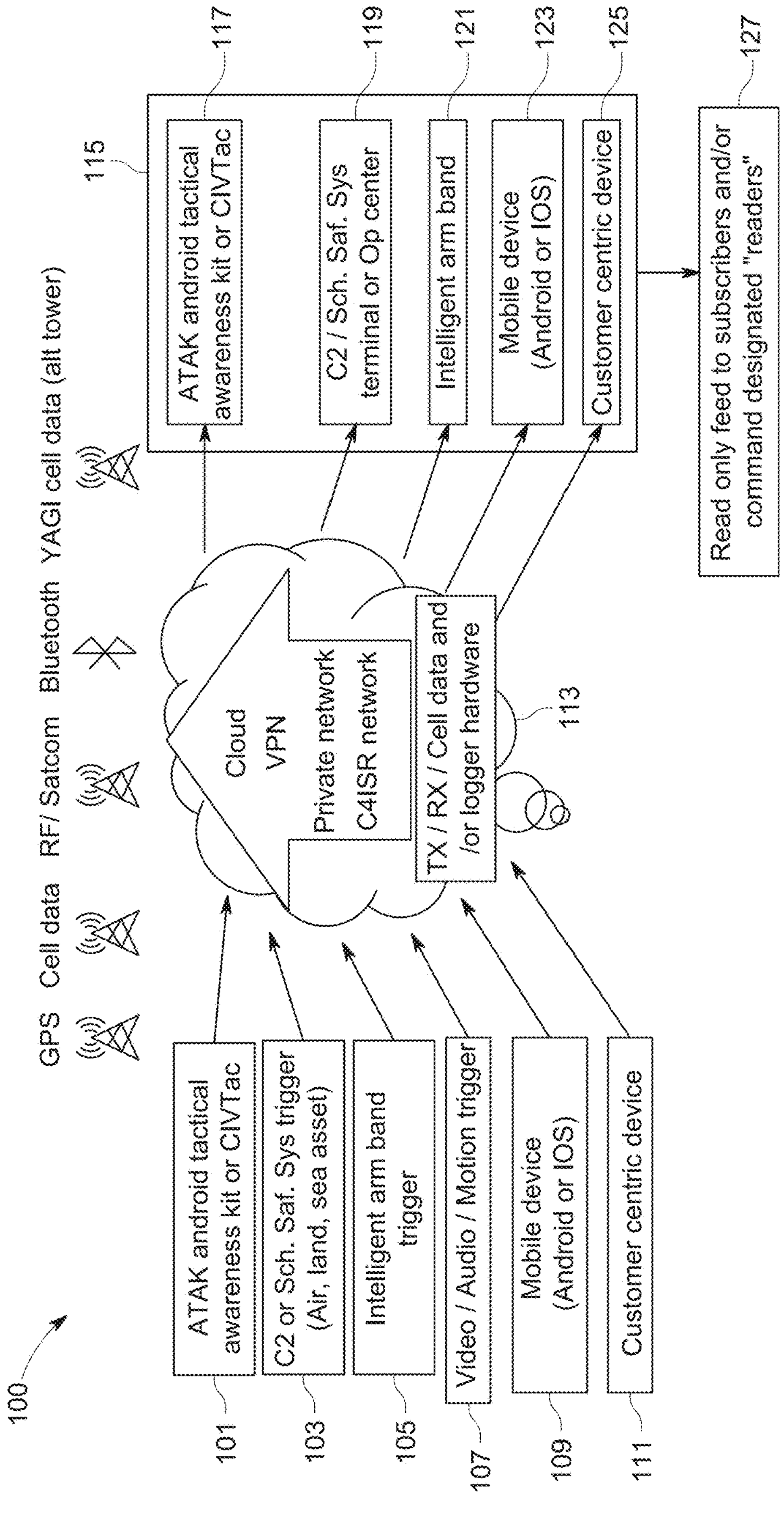
FIG. 1 shows a block diagram that illustrates a network environment of a site safety system, in accordance with an example embodiment.

Reference will be made to the figures, showing various embodiments of a Site Safety System. Though such system is not limited to only school settings, it may be referred to as a School Safety System in school settings, and the majority of the description that follows will be sited at a school location.

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings.

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The term "comprises", and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40% means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

The embodiments set forth the below represent the necessary information to enable those skilled in the art to practice the invention and illustrate the best mode of practicing the invention. For the measurements listed, embodiments including measurements plus or minus the measurement times 5%, 10%, 20%, 50% and 75% are also contemplated. For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

In addition, the invention does not require that all the advantageous features and all the advantages of any of the embodiments need to be incorporated into every embodiment of the invention.

FIG. 1 shows a block diagram that illustrates a network environment 100 of a site safety system, in accordance with an example embodiment. The network environment 100 that includes one or more trigger components such as an Android Tactical Awareness Kit (ATAK) or CIVTac 101, air, land, and sea asset trigger 103, an intelligent arm band trigger 105, video, audio, and/or motion trigger 107, a mobile device (Android or iOS) trigger 109 and a customer centric device trigger 111. The one or more trigger components are communicatively coupled to user end devices 115 via a network 113. The network 113 may be a secured, unsecured, VPN or private network. The user end devices 115 may include ATAK or CIVTac 117, an operation center 119, an intelligent arm band 121, a mobile device (Android or iOS) 123, and a customer centric device 125. The user end devices 115 may render read only feed to subscribers and/or command designated readers 127. The site safety system network may continue to actively improve its efficiency and intelligence with addition of each additional node, user, subscriber, or site safety system headquarters element to the network 113. Further, the site safety system provides cyber security by testing and certifying a set of hardware devices that can be connected to the network 113. The set of hardware devices may be tested and verified via cyber site surveys to ensure network security from outside cyber threats. In an embodiment, Transport Layer Security (TLS) security with updates may be followed.

Figure 2:
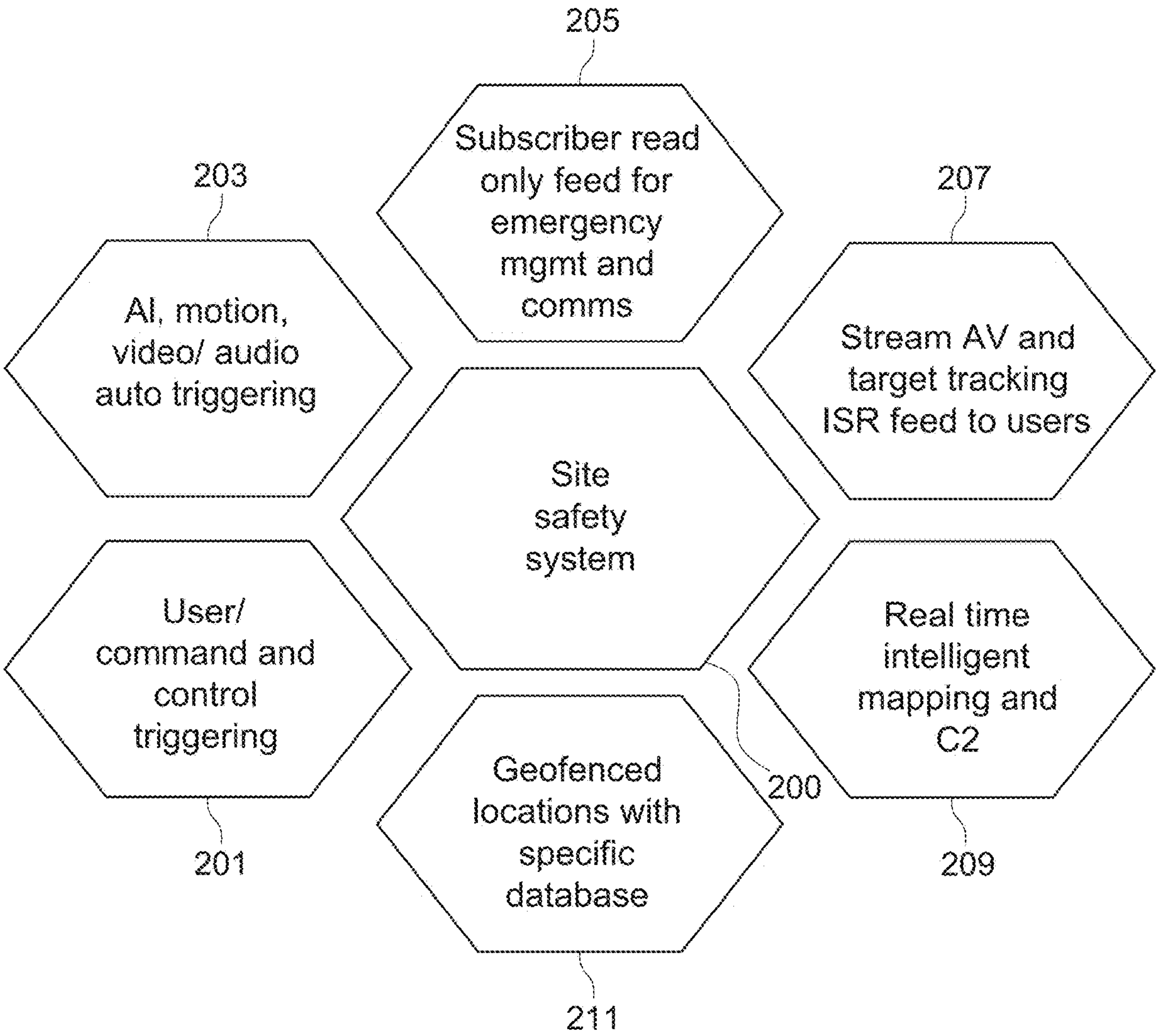
FIG. 2 shows a schematic of functions of the site safety system, in accordance with an example embodiment.

FIG. 2 shows a schematic of functions of a site safety system 200, in accordance with an example embodiment. The site safety system 200 is a network program and set of applications to enhance situational awareness, command and control, and communication of active threats in an area, such as a school building, college campus, commercial building, industrial building, mall, sports facility, residential building, airport, transit station, or other similar structure. The site safety system 200 is configured for real time network notification, management, trigger initiation and monitoring of an active threat to life, limb, or property. In an embodiment, the site safety system 200 corresponds to a downloadable application for mobile, fixed, or stand-alone users via android and/or iOS systems. In an alternate embodiment, the site safety system 200 is a read-only downloadable application for subscribers or command designates with no editable access. The site safety system 200 is compatible with ATT, Verizon first responder, and U.S. Department of Homeland Security (DHS) or Federal Emergency Management Agency (FEMA) networks.

The site safety system 200 allows user command and control triggering 201. For instance, a user may initiate triggering of the active threats by providing a command-initiated triggering via their mobile device. Additionally, or alternatively, the triggering of the active threats may be initiated by manned operation centers, aircrafts (piloted and unpiloted), vehicles (manned and unmanned), and hard-wired physical devices. In some embodiments, the site safety system 200 provides motion, video, and/audio or artificial intelligence (AI) based triggering 203. For example, when the site is a school building, the school building may be installed with one or more sensors such as a camera, a microphone, and the like. The one or more sensors may be spaced from one another and communicatively connected to each other via a command center server (not shown in FIG. 2). The site safety system 200 may receive video feeds from the camera and audio feeds from the microphone. Alternatively, the video feeds may be accomplished by video devices and pre-programmed threat identification via user designated trigger selections. The site safety system 200 may analyze the video feeds and the audio feeds using AI techniques and provide remote automated triggering. Such triggering may be referred to as video and audio triggering. In an embodiment, the site, such as the school comprises a plurality of users and their associated devices, such as their mobile electronic devices. These mobile electronic devices may act as multiple trigger devices at the site. Each of these multiple trigger devices may be equipped with one or more sensors like cameras, microphones, and the like. Further each of these mobile electronic devices may be capable of having instructions stored on mobile electronic device memories that cause the mobile electronic devices to act as trigger devices for the site, such as the school building.

Likewise, the school building may be installed with motion sensors such as an accelerometer, a seismometer, and the like. The site safety system 200 may receive motion feeds from the motion sensors. The site safety system 200 may provide the remote automated triggering based on the motion feeds. Such triggering may be referred to as a motion activated trigger. According to some embodiments, the site safety system 200 may provide the remote automated triggering based on a combination of the video feeds, the audio feeds, and the motion feeds. Encryption may be utilized to ensure feeds are secure from cyber or unauthorized access. Multiple triggers of a single active threat are eliminated through a network of the sensors installed in the school building. Further, in some embodiments, the site safety system 200 may provide an AI determined trigger, based on facial, weapon, suspect, and behavioral identification via active or passive methods, for triggering and environmental tracking of the active threat.

In an embodiment, the site safety system 200 may use AI, programming, and wireless mesh networking proximity to prevent false triggers. The site safety system 200 may be incorporated with a two-factor authentication input or a verbal audio trigger word dictated to users only via command/management. In an alternate embodiment, the automated triggers are managed via a smart data logger which may be a multi-mode data logger.

Further, according to some embodiments, the site safety system 200 provides read only feed 205 to all or command designated subscribers and users for emergency management and commands. The read only feed may include threat data. The subscribers may include parent, family member, concerned citizen, relatives, and command dictated reader. For education sector subscribers, for example, parents, a read-only version with command controlled and initiated viewing permissions may be granted. Additionally, or alternatively, the site safety system 200 may provide preprogramed and intelligent push notifications to the users and the subscribers. The push notifications may include pick-up points, location status, and emergency information. Further, pre-programmed building diagrams, casualty collection points, first aid stations, rally points, safe exit lanes, and other user created tools are actively rendered on cloud, web, VPN, or other customer networks to the users.

To that end, the read only feed provides the subscriber with situational awareness in their community, business, neighbourhood, and other important locations. Additionally, in some embodiments, through the read only feed, the push notifications and emergency messaging can be provided to the subscribers through site safety system headquarters direction. The site safety system 200 also allows for notifications of information including video, audio, GPS data, satcom data/voice, microwave radio, and preprogrammed messages. The site safety system 200 may also remotely communicate training, informational, and customer requested data/video courses or files to the users and the subscribers.

In some implementations, notification of status updates and decision tree selections may be selected by user using a GUI on their mobile electronic devices. Real time location and status of the active threat is communicated to the users and designated read-only "readers" or subscribers. Further, user designated icons and colors of users reflecting status, role, and function may be used to designate activity in a defined area of operation. The user may select an industry specific template for the icons and colors of users reflecting the status, the role, and the function.

In an embodiment, through a site safety system 'End User Agreement', GPS and compass data feeds may be enabled in the mobile electronic devices. This allows super users to communicate their situational awareness data to prospective users as they enter a new geofenced location using the site safety system 200.

In some alternate embodiments, the site safety system 200 may store a history of event data and may be uploaded to a subscriber or user feed that can serve as a historically significant actions database. Such subscriber or user feed may educate the subscribers and/or users of dangerous locations to avoid.

According to some embodiments, the site safety system 200 may live stream 207 the audio and video feeds through through cloud platforms, hard wired networks, wireless mesh networks, and customer centric VPNs to provide real time tracking of the active threats to the users. For ensuring security, encryption and wireless feed masking may be used for the live streaming. The site safety system 200 utilizes an artificial intelligence enabled multi-mode data logger with a buffer to allow the live streaming over a network and recording triggered events that fit a set programmed or "learned" rules. Using the buffer with a flash memory and a microcontroller, the triggered event may start recording before the event has been triggered using a feed in the buffer/flash memory. This allows the user to access recorded data with high resolution prior to the event. The live/real time streaming of the audio and video feeds lessens reliance on high storage devices and allows the triggered events to be recorded in the high resolution. When the event is deemed secure, the recording may be stopped via a command and control. The recorded data may be streamed to the users.

In some embodiments, an aircraft may initiate a trigger. For instance, intelligence, surveillance, and reconnaissance (ISR) platforms with LIDAR, RADAR, IR, video, and intelligence capabilities may be utilized to determine the trigger and push notification over the network. Such determination of the trigger and push notification may be preprogrammed, command initiated via ISR feed, or user defined. The aircrafts can act as network repeaters/broadcasters in event of ground communication loss. The site safety system 200 may further stream target tracking ISR feed to the users.

In some embodiments, the site safety system 200 provides real time intelligent mapping 209. The site safety system 200 enables real time tracking of the users based on GPS data from user devices such as a mobile device, small form factor communication device, ID card with GPS TX/RX imbedded, GPS enabled wristband, and other customer centric devices with GPS and compass capability. Such real time mapping of users increases situational awareness. In some embodiments, building and location layouts, diagrams, blueprints, and emergency management plans are preloaded in the user devices. In some other embodiments, wireless mesh networks may be used to increase accuracy of the real time mapping of the users. Additionally, in a similar manner, operators on ground responding to the active threat may be tracked.

In an embodiment, the site safety system 200 includes geofenced locations with specific database 211. Geofenced customer locations may have emergency management plans preprogrammed for streaming throughout the network as well as guiding users' decision tree during an active event. Geofencing of customer locations also allows for push notification of additional subscriptions based on commonly visited venues. A goal of such push notification is to allow the subscriber to actively follow guidance, the threat data, communications, and direction from DOD/DHS, emergency management, law enforcement, and FEMA/other similar entities. Additionally, in some embodiments, the subscribers may be provided with an option to "opt-in" to new geofenced locations in their proximity via the 'End User Agreement' and mobile device location enabled user locations. Further, advertisement data and social patterning data may be marketed securely to interested customers.

In some implementations, the site safety system 200 facilitates a provision for automatic locking/unlocking of a door, such as classroom and hall door, during the active threat event to protect children from the active threats and contain armed threats. For this, the site safety system 200 comprises a first remote powered lock communicatively connected to the site safety system 200. The site safety system 200 may be encrypted using all methods, with some user devices capable of TEK/KEK NSA encryption upload data through MTh SPEC Comms port.

In some implementations, primary, alternate, contingency, and emergency communications pathways are incorporated into the site safety system 200. In addition, cellular data, cellular voice, satcom data, satcom voice, SMS texting, FM microwave radio, and multiple alternate directional cellular data/voice communications pathways may be incorporated into the site safety system 200. As a result, cellular tower bandwidth overloading during an active threat event reporting by cellular users is significantly reduced. In an embodiment, a multi-mode data logger is incorporated into the site safety system 200 to allow different communications pathways, as described below with reference to FIG. 3.

Figure 3:
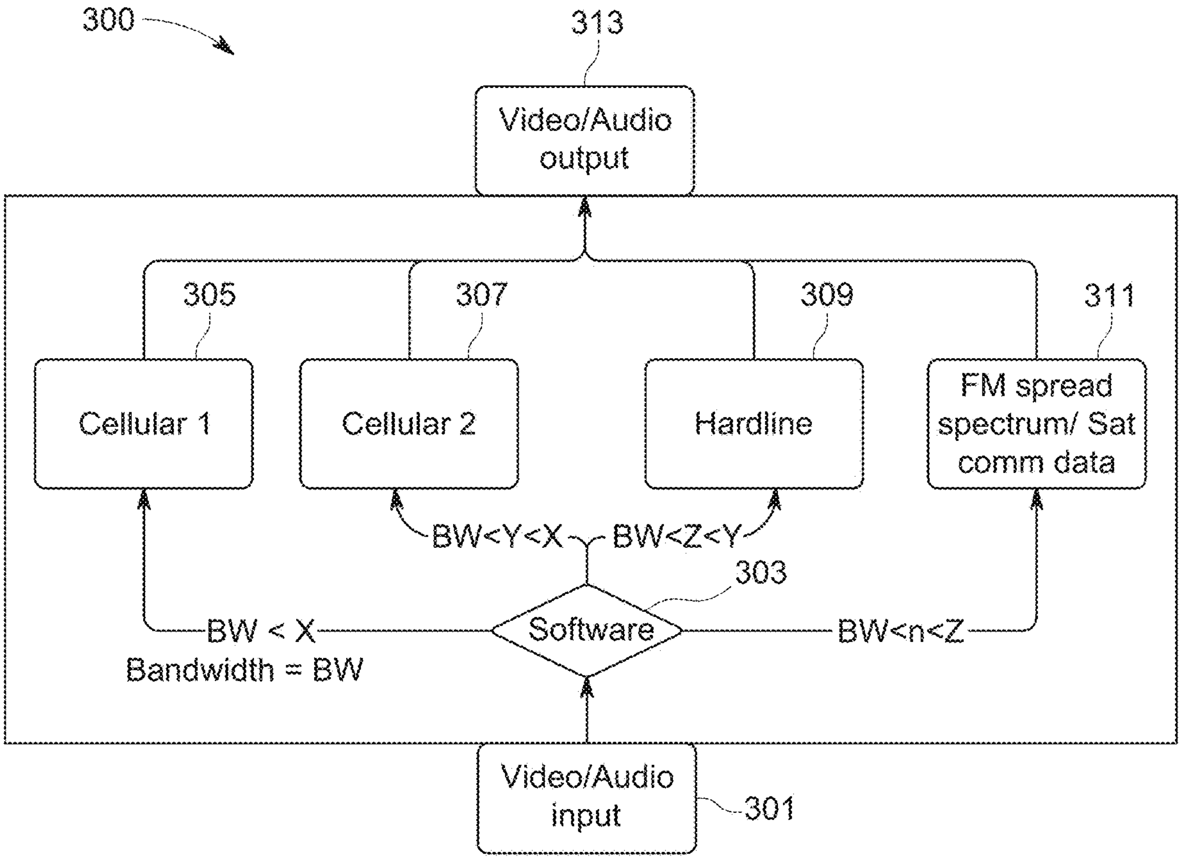
FIG. 3 shows a block diagram of a multi-mode data logger, according to some embodiments.

FIG. 3 shows a block diagram of the multi-mode data logger 300, according to some embodiments. The multi-mode data logger 300 is communicatively connected to an onsite command center server. The multi-mode data logger 300 receives a data input, such as a video/audio input 301 from the onsite command center server. Further, the multi-mode data logger 300 communicates the video/audio input 301 (also referred to as 'data') to the users via one of a selection of communication pathways such as a first pathway (primary) 305, a second pathway (alternate) 307, a third pathway (contingency) 309, and fourth pathway (emergency) 311. In the embodiment shown, the primary pathway 305 is a first cellular pathway, the alternate pathway 307 is a second cellular pathway, the contingency pathway 309 is a hardline or landline pathway, and the emergency pathway 311 is one of FM spread spectrum or SATCOM pathway. The multi-mode data logger 300 includes the data input, connected to the onsite command center server to receive data therefrom, and a data output for each pathway. For example, the multi-mode data logger 300 may include a first data output, a second data output, a third data output, and a fourth data output. The first data output is one of a first cellular output and a landline, the second data output is one of the first cellular output, a second cellular output, and the landline, the third data output is one of the second cellular output and the landline, and the fourth data output is one of a FM spread spectrum output and a satellite communications output.

The multi-mode data logger 300 also includes a multi-mode data logger processor and a multi-mode data logger memory communicably connected to the multi-mode data logger processor, the multi-mode data logger memory having data pathway selection software 303 stored thereupon. The software 303 comprises instructions for execution by the multi-mode data logger processor to perform data pathway selection functions by the software 303. The instructions when executed by the multi-mode data logger processor causes the multi-mode data logger processor to automatically determine, based on available bandwidth for each pathway (depicted as X, Y, Z, and n in FIG. 3) and the required bandwidth needed to be transmitted (depicted as BW in FIG. 3), the preferable.

In the FIG. 3, the multi-mode data logger 300 determines a required current bandwidth BW, and then determines a bandwidth availability X of a first communication pathway 305. For this the multi-mode data logger 300 monitors available bandwidth via the first data output or first communication pathway 305 and the second data output or the second communication pathway 307. If the bandwidth required BW is less than the bandwidth availability X of the first communication pathway 305, then the data may be routed via the first communication pathway 305. If the bandwidth required BW is not less than the bandwidth availability X of the first communication pathway 305, then the multi-mode data logger 300 determines the bandwidth availability Y of the second communication pathway 307. If the bandwidth required BW is less than the bandwidth availability Y of the second communication pathway 307, then the data may be routed via the second communication pathway 307 by switching the route for sending data from the data input to the second communication pathway 307. If the bandwidth required BW is not less than the bandwidth availability Y of the second communication pathway 307, then the multi-mode data logger 300 determines the bandwidth availability Z of the third communication pathway 309 or the third data output 309. If the bandwidth required BW is less than the bandwidth availability Z of the third communication pathway 309, then the data may be routed via the third communication pathway 309 by switching the route for sending data from the data input to the third communication pathway 309. If the bandwidth required BW is not less than the bandwidth availability Z of the third communication pathway 309, then the multi-mode data logger 300 routes the data via the fourth communication pathway 311 or the fourth data output 311, by switching the route for sending data from the data input to the fourth communication pathway 311. In an embodiment, the first data output and the second data output may be a default route for sending the data from the data input to a data output.

In the embodiment shown in FIG. 3, the first cellular output is communicatively connected to an omnidirectional antenna, the second cellular output is communicatively connected to a directional antenna, the landline output is communicatively connected to a wired data connection that extends off the building premises, the FM spread spectrum output is communicatively connected to a spread spectrum radio and the satellite communications output is communicatively connected to a SATCOM transceiver. The omnidirectional antenna may be one of a batwing antenna, a biconical antenna, a cage aerial, a choke ring antenna, a coaxial antenna, a crossed field antenna, a dielectric resonator antenna, a dipole antenna, a discone antenna, a folded unipole antenna, a franklin antenna, a ground-plane antenna, a halo antenna, a helical antenna, a j-pole antenna, a mast radiator, a monopole antenna, a random wire antenna, a rubber ducky antenna, a turnstile antenna, a t2fd antenna, a t-antenna, an umbrella antenna, and a whip antenna, for example. The directional antenna may be one of an adcock antenna, an AS-2259 antenna, an AWX antenna, a beverage antenna, a cantenna, a cassegrain antenna, a collinear antenna, an array conformal antenna, a corner reflector antenna, a curtain array, dipole antenna, a folded inverted conformal antenna, a fractal antenna, a G5RV antenna, a gizmotchy, a helical antenna, a horn antenna, an inverted-F antenna, an inverted vee antenna, a log-periodic antenna, a loop antenna, a microstrip antenna, a moxon antenna, a offset dish antenna, a patch antenna, a phased array, a planar array, a parabolic antenna, a plasma antenna, a quad antenna, a reflective array antenna, a regenerative loop antenna, a rhombic antenna, a sector antenna, a short backfire antenna, a sloper antenna, a slot antenna, a sterba antenna, a vivaldi antenna, a WokFi, and a Yagi-Uda antenna, for example. The Yagi-Uda antenna is the preferred directional antenna. The wired data connection may be one of a dsl line, a coaxial cable line, and a fiber optic line, for example. The directional antenna may be directed at a cellular tower that is not the closest cellular tower to the building.

Figure 4:
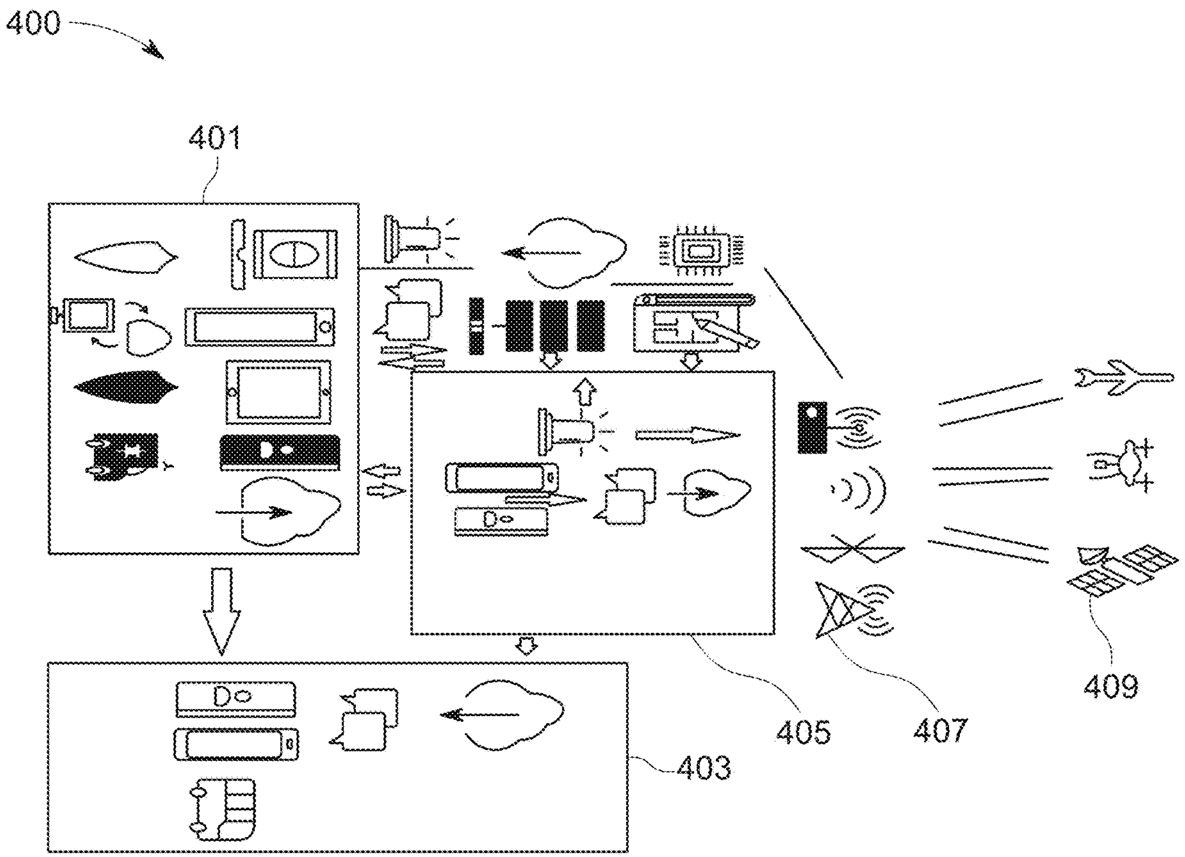
FIG. 4 shows a working environment of the site safety system, according to some other embodiments.

FIG. 4 shows a working environment 400 of the site safety system 200, according to some other embodiments. The working environment 400 may include different sets of user/subscriber's devices, for example, a first set of user devices 401, a second set of user devices 403, and a third set of user devices 405. Any of the first set of user devices 401, the second set of user devices, and the third set of user devices 405 may be associated with multiple individuals which are remote from the site but have relatives who are at the site, and thus, they receive push notifications from the site, issued by the command center server. Similarly, any of the first set of user devices 401, the second set of user devices, and the third set of user devices 405 may be configured as trigger devices. The working environment 400 may further include air assets 409 that initiate the triggering of the active threats via a network 407.

Figure 5:
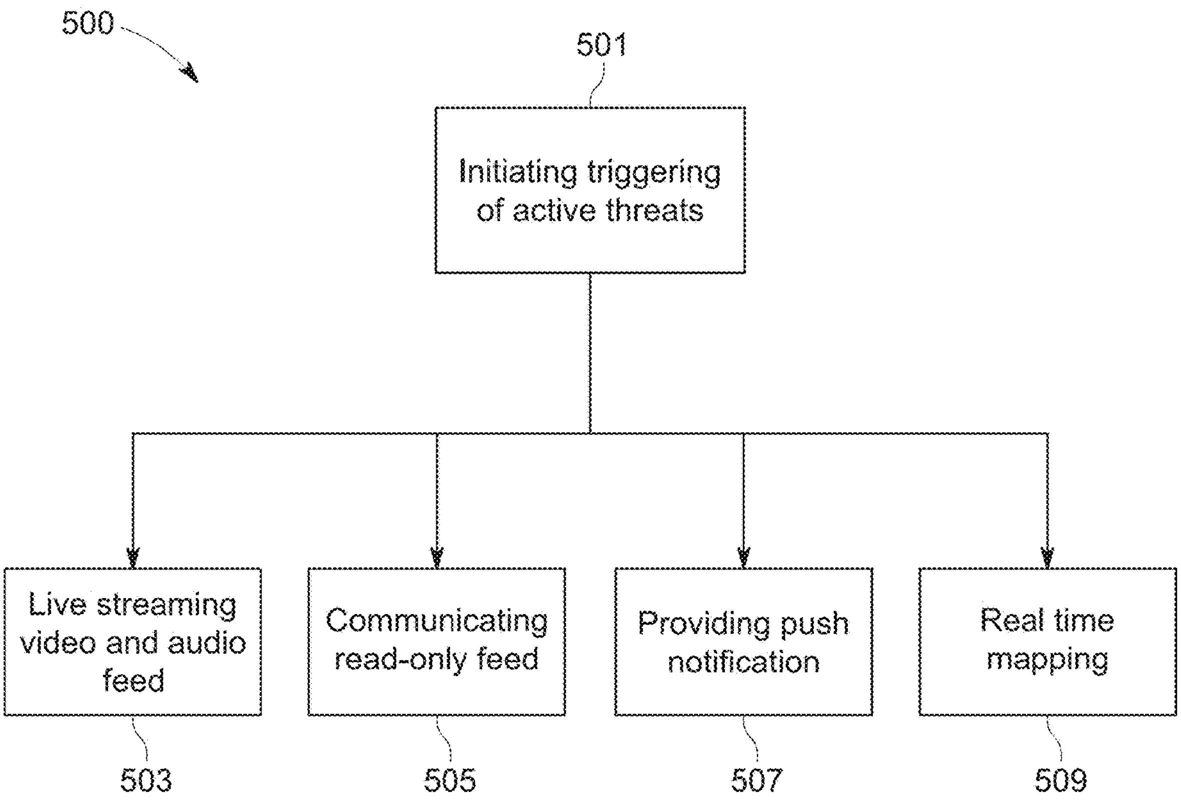
FIG. 5 shows a block diagram of a site safety method, according to an embodiment.

FIG. 5 shows a block diagram of a site safety method 500 for aiding in the site safety, according to an embodiment. The site safety method 500 includes initiating 501 triggering of the active threats. In response to initiating the triggering of the active threats, the site safety method 500 includes live streaming 503 the video and audio feed to the users, communicating 505 the read only feed to the users, providing push notification to the users 507, and real time mapping 509. Each of the aforesaid steps of the site safety method 500 is described above with reference to FIG. 2. In some embodiments, the aforementioned steps 503-509 of the site safety method 500 are carried out simultaneously. In some other embodiments, the aforementioned steps 503-509 of the site safety method 500 are carried out sequentially.

Figure 6:
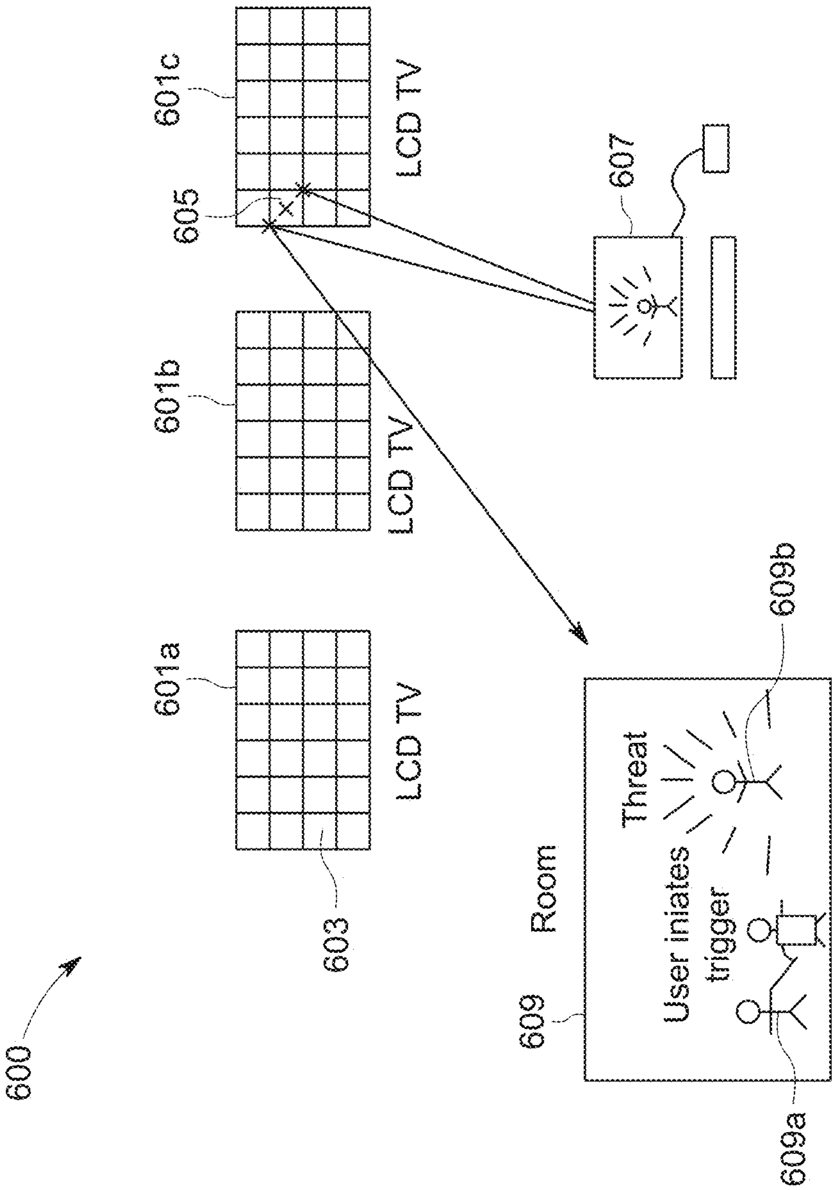
FIG. 6 illustrates a command center setup associated with a school building, according to an embodiment.

FIG. 6 illustrates a command center setup 600 associated with a site, such as a school building, according to an embodiment. Sensors, such as video cameras and microphones, may be installed at different locations within the school building. For example, the command center set-up includes a first sensor which is a video camera at a first location, and a second sensor, which is a video camera at a second location, such that the first sensor and the second sensor are spaced from one another. The first location may be at an entrance of the school building. The second location may be at an interior door in the building providing access to a room. The room may be a classroom, conference room, office room, or the like. The first location and the second location may be out of eyesight of each other. Likewise, in some embodiments, the microphones may be installed at different locations within the school building. Each sensor is communicatively connected to an onsite command center server 607. The onsite command center server 607 includes a command center processor coupled to a command center system bus, a command center memory coupled to the command center system bus, and a command center communication interface coupled to the command center system bus. The command center memory being a non-transitory machine-readable storage medium configured to store instructions for execution by the command center processor.

Further, the command center setup 600 includes multiple display units 601*a*, 601*b*, and 601*c*. The multiple display units 601*a*, 601*b*, and 601*c* may be liquid-crystal display (LCD) screen devices. Video feeds from the video cameras installed in the school building are rendered on the multiple display units 601*a*, 601*b*, and 601*c* in form of a grid. Each block, such as a block 603 of the grid is associated with respective video camera. At each block, the video feed from the respective video camera is rendered. For example, the block 603 may be associated with the video camera installed at the entrance of the school building, and at block 603 the video feed from the video camera installed at the entrance of the school building is rendered. A super user may be monitoring the video feeds rendered on the multiple display units 601*a*, 601*b*, and 601*c*.

For instance, a user within a room of the school building may interpret presence of a threat in vicinity of the user and send a threat notification to onsite command center server 607, using a mobile electronic device (which thus acts as a first trigger device) carried by the user. Further, the onsite command center server 607 may obtain a location of the mobile electronic device or a trigger device from which the threat notification is received. The onsite command center server 607 may further identify a video camera which is closest to the location of the mobile electronic device. Further, in response to identifying the closest video camera, a block in the grids that is associated with the identified closest video camera may flash to notify the super user about the threat. For example, a block 605 may be the block of the grid that is associated with the identified closest video camera and. video feed from the identified closest video camera may be rendered at the block 605. The block 605 may flash to notify the super user about the threat.

Further, the super user may monitor the video feed being rendered at the block 605 and confirm the threat. For example, an enlarged view 609 of the video feed rendered at the block 605 is shown. The video feed may include the user 609*a* and the threat 609*b*. The user 609*a* may correspond to a user who sent the threat notification in response to realization of the presence of the threat 609*b*. The super user may tag the threat 609*b* to confirm the threat. In some embodiments, the video feed being rendered at the block 605 may be rendered on a display device associated with the onsite command center server 607 and the super user may tag the threat 609*b* using a pointing device (such as a mouse) associated with the onsite command center server 607.

In some alternate embodiments, the onsite command center server 607 may identify a plurality of video cameras (e.g., four video cameras) closest to the location of the mobile electronic device instead of identifying one video camera closest to the location of the mobile electronic device. Further, the super user may monitor video feeds from the identified plurality of video cameras and confirm the threat. Upon the confirmation of the threat, the onsite command center server 607 may transmit threat information, via the multi-mode data logger (such as discussed in FIG. 3), to responders such as the Verizon first responder, (DHS), or FEMA networks. Additionally, or alternatively, the onsite command center server 607 may issue the push notifications to multiple individuals who are remote from the school building but have relatives who are at the school building. In addition, in some embodiments, the school building may include electric powered door locks, and the onsite command center server 607 may instruct one or more electric powered door locks in proximity to the location of the mobile electronic device to contain the threat.

In some embodiments, multiple threat notifications from multiple users' mobile electronic devices may be received for a single threat. In such a case, the super user may monitor video feeds from video cameras closest to locations of the multiple users' mobile electronic devices and confirm location of the threat. This prevents false triggering of the threats.

According to some embodiments, at initial stage, the super user is involved as a part of operation of the onsite command center server 607, for example, to confirm the threat, prevent the false triggering and the like. The onsite command center server 607 is configured to continuously learn triggering of threats based on data input by the super user, such as tagging of the threat in the video feed, to automate the triggering/identification of the threat. As a result, after a certain point of time, the triggering of threats is automated and human intervention, i.e., the super user involvement, is eliminated.

Thus, using the architecture 600 of the command center setup illustrated in FIG. 6, along with the site safety system 200 illustrated in FIG. 2, including the multi-mode data logger 300 illustrated in FIG. 3, safety of any site may be enhanced. Further, using bandwidth efficient multi-mode data logger 300 may increase the chances of timely threat interception, information, and prevention, thereby saving life and money of the individuals under threat and their relatives thereof.

Embodiments of the presently disclosed subject matter may be implemented in and used with a variety of component and network architectures. For example, the site safety system may include one or more computing devices for implementing embodiments of the subject matter described above. The computing device may be, for example, a desktop or laptop computer, or a mobile computing device such as a smart phone, tablet, video conferencing/telemedicine system or the like. The computing device may include a bus which interconnects major components of the computer, such as a central processor, a memory such as Random Access Memory (RAM), Read Only Memory (ROM), flash RAM, or the like, a user display such as a display screen, a user input interface, which may include one or more controllers and associated user input devices such as a keyboard, mouse, touch screen (which may be considered part of the interface), and the like, a fixed storage such as a hard drive, flash storage, and the like, a removable media component operative to control and receive an optical disk, flash drive, and the like, and a network interface operable to communicate with one or more remote devices via a suitable network connection.

The bus allows data communication between the central processor and one or more memory components, which may include RAM, ROM, and other memory, as previously noted. Typically, RAM is the main memory into which an operating system and application programs are loaded. A ROM or flash memory component can contain, among other code, the Basic Input-Output System (BIOS) which controls basic hardware operation such as the interaction with peripheral components. Applications resident with the computer are generally stored on and accessed via a computer readable medium, such as a hard disk drive (e.g., fixed storage), an optical drive, floppy disk, or other storage medium.

The fixed storage may be integral with the computer or may be separate and accessed through other interfaces. The network interface may provide a direct connection to a remote server via a wired or wireless connection. The network interface may provide such connection using any suitable technique and protocol as will be readily understood by one of skill in the art, including digital cellular telephone, Wi-Fi, Bluetooth®, near-field, and the like. For example, the network interface may allow the computer to communicate with other computers via one or more local, wide-area, or other communication networks, as described in further detail below.

Many other devices or components (not shown) may be connected in a similar manner (e.g., document scanners, digital cameras and so on). The components can be interconnected in different ways from that shown. Code to implement the present disclosure can be stored in computer-readable storage media such as one or more of the memory, fixed storage, removable media, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor or an Application Specific Integrated Circuit (ASIC) that embodies all or part of the techniques according to embodiments of the disclosed subject matter in hardware or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

In some embodiments, the microphones and cameras may be implemented as part of a network of sensors. These sensors may include microphones for sound detection and cameras for visual detection, for example, and may also include other types of sensors. In general, a "sensor" may refer to any device that can obtain information about its environment. Sensors may be described by the type of information they collect. For example, sensor types as disclosed herein may include waveform, chemical emission, motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a school campus integrated into a Site Safety System. For example, a sensor may operate as a security sensor when it is used to determine security events such as unauthorized entry. A sensor may operate with different functions at different times, such as where a motion sensor is used to control lighting when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, or other sensors. Such housing also may be referred to as a sensor or a sensor device. For clarity, sensors are described with respect to the particular functions they perform, or the particular physical hardware used, when such specification is necessary for understanding of the embodiments disclosed herein.

A sensor may include hardware in addition to the specific physical sensor that obtains information about the environment. The sensor may include an environmental sensor, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, video camera, weight scale, or any other suitable environmental sensor, that obtains a corresponding type of information about the environment in which the sensor is located. A processor may receive and analyze data obtained by the sensor, control operation of other components of the sensor, and process communication between the sensor and other devices. The processor may execute instructions stored on a computer-readable memory. The memory or another memory in the sensor may also store environmental data obtained by the sensor. A communication interface, such as a Wi-Fi or other wireless interface, Ethernet or other local network interface, or the like may allow for communication by the sensor with other devices. The user interface may provide information to or receive input from a user or the sensor. The UI may include, for example, a speaker to output an audible alarm when an event is detected by the sensor. Alternatively, or in addition, the UI may include a light to be activated when an event is detected by the sensor. The user interface may be relatively minimal, such as a limited-output display, or it may be a full-featured interface such as a touchscreen. Components within the sensor may transmit and receive information to and from one another via an internal bus or other mechanism as will be readily understood by one of skill in the art. Furthermore, the sensor may include one or more microphones to detect sounds in the environment. One or more components may be implemented in a single physical arrangement, such as where multiple components are implemented on a single integrated circuit. Sensors as disclosed herein may include other components or may not include all of the illustrative components shown.

Sensors as disclosed herein may operate within a communication network, such as a conventional wireless network, or a sensor-specific network through which sensors may communicate with one another or with dedicated other devices. In some configurations one or more sensors may provide information to one or more other sensors, to a central controller, or to any other device capable of communicating on a network with the one or more sensors. A central controller may be general or special-purpose. For example, one type of central controller is a site safety system campus centered or remote command automation network that collects and analyzes data from one or more sensors within the school campus. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within the campus or building that includes the site safety system automation or sensor network. Alternatively, or in addition, a central controller as disclosed herein may be remote from the sensors, such as where the central controller is implemented as a cloud-based system, for example, that communicates with multiple sensors, which may be located at multiple locations and may be local or remote with respect to one another.

Devices (such as servers or sensors, for example) or components (such as processors or memory, for example) that are communicatively connected to each other refers herein to those devices or components that are connected to each other, via wired and/or wireless connections, in the sense that electronic data is exchanged between the devices or components. The data exchanged may be in one or both directions between the devices or components.

In a further embodiment, the system can run on a cloud based server with or without local hardware device. In a further embodiment, the system can also use a mix of cloud based servers and internal user network with internal user encryption with local device using multiple communication nodes.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

What is claimed is:

1. A site safety system comprising:

an onsite command center server including a command center processor coupled to a command center system bus, a command center memory coupled to the command center system bus, the command center memory being a non-transitory machine-readable storage medium configured to store instructions for execution by the command center processor, and a command center communication interface coupled to the command center system bus;

a first sensor and a second sensor spaced from one another and communicatively connected to the onsite command center server;

a multi-mode data logger communicatively connected to the onsite command center server including a data input receiving data from the onsite command center server, a first data output and a second data output, being the default route for sending the data from the data input to a data output, a multi-mode data logger processor coupled to a multi-mode data logger system bus, a multi-mode data logger memory coupled to the multi-mode data logger system bus, the multi-mode data logger memory being a non-transitory machine-readable storage medium configured to store instructions for execution by the multi-mode data logger processor, the multi-mode data logger memory containing instructions causing the multi-mode data logger processor to:

monitor available bandwidth via the first data output and the second data output, and when a bandwidth required to transmit data received from the data input exceeds the available bandwidth via the first data output, switch the route for sending data from the data input to the second data output;

a first data transmitter communicatively connected to the first data output;

a second data transmitter communicatively connected to the second data output; and a first remote powered lock communicatively connected to the onsite command center server.

2. The system of claim 1, wherein the first sensor is a video camera in a first location and the second sensor is a video camera in a second location out of eyesight of the first location.

3. The system of claim 2, wherein the first location is an entrance to a building.

4. The system of claim 3, wherein the second location is an interior door in the building providing access to a room.

5. The system of claim 4, wherein the room is a classroom.

6. The system of claim 2, further comprising a third sensor communicatively connected to the onsite command center server, wherein the third sensor is a microphone.

7. The system of claim 1, wherein the multi-mode data logger further comprises a third data output, a fourth data output, and the multi-mode data logger memory further containing instructions causing the multi-mode data logger processor to monitor available bandwidth via the third data output and the fourth data output, and when the bandwidth required to transmit data received from the data input exceeds the available bandwidth via the second data output, switch the route for sending data from the data input to the third data output, and when a bandwidth required to transmit data received from the data input exceeds the available bandwidth via the third data output, switch the route for sending data from the data input to the fourth data output.

8. The system of claim 7, wherein the first data output is one of a first cellular output and a landline, the second data output is one of the first cellular output, a second cellular output, and the landline, the third data output is one of the second cellular output and the landline, and the fourth data output is one of a FM spread spectrum output and a satellite communications output.

9. The system of claim 8, wherein the first cellular output is communicatively connected to an omnidirectional antenna, the second cellular output is communicatively connected to a directional antenna, the landline output is communicatively connected to a wired data connection that extends off the building premises, the FM spread spectrum output is communicatively connected to a spread spectrum radio and the satellite communications output is communicatively connected to a SATCOM transceiver.

10. The system of claim 9, wherein the omnidirectional antenna is one of a batwing antenna, a biconical antenna, a cage aerial, a choke ring antenna, a coaxial antenna, a crossed field antenna, a dielectric resonator antenna, a dipole antenna, a discone antenna, a folded unipole antenna, a franklin antenna, a ground-plane antenna, a halo antenna, a helical antenna, a j-pole antenna, a mast radiator, a monopole antenna, a random wire antenna, a rubber ducky antenna, a turnstile antenna, a t2fd antenna, a t-antenna, an umbrella antenna, and a whip antenna.

11. The system of claim 9, wherein the directional antenna is one of an adcock antenna, an AS-2259 antenna, an AWX antenna, a beverage antenna, a cantenna, a cassegrain antenna, a collinear antenna, an array conformal antenna, a corner reflector antenna, a curtain array, dipole antenna, a folded inverted conformal antenna, a fractal antenna, a G5RV antenna, a gizmotchy, a helical antenna, a horn antenna, an inverted-F antenna, an inverted vee antenna, a log-periodic antenna, a loop antenna, a microstrip antenna, a moxon antenna, a offset dish antenna, a patch antenna, a phased array, a planar array, a parabolic antenna, a plasma antenna, a quad antenna, a reflective array antenna, a regenerative loop antenna, a rhombic antenna, a sector antenna, a short backfire antenna, a sloper antenna, a slot antenna, a sterba antenna, a vivaldi antenna, a WokFi, and a Yagi-Uda antenna.

12. The system of claim 11, wherein the directional antenna is directed at a cellular tower that is not the closest cellular tower to the building.

13. A method for aiding in site safety comprising:

(a) monitoring a status of multiple trigger devices at a site, wherein the multiple trigger devices include one or more sensors;

(b) when a first trigger device interprets a threat, sending a threat notification from the first trigger device to an onsite command control server; and (c) after the threat is confirmed, a command control server processor sending threat information via a multi-mode data logger to a first responder;

(d) wherein the multi-mode data logger (i) monitors, via a multi-mode data logger processor, an available bandwidth for each of a first, a second, a third, and a fourth data path, (ii) receives data from the onsite command control server through a data input at a given bandwidth requirement, (iii) when the available bandwidth for the first data path is at least as large as the bandwidth requirement, the multi-mode data logger processor sends the received data through the first data path, (iv) when the available bandwidth for the first data path is at smaller than the bandwidth requirement, and the available bandwidth for the second data path is at least as large as the bandwidth requirement, the multi-mode data logger processor sends the received data through the second data path, (v) when the available bandwidth for the first and the second data path is at smaller than the bandwidth requirement, and the available bandwidth for the third data path is at least as large as the bandwidth requirement, the multi-mode data logger processor sends the received data through the third data path, and (vi) when the available bandwidth for the first, the second, and the third data path is at smaller than the bandwidth requirement, the multi-mode data logger processor sends the received data through the fourth data path;

wherein the first cellular output is communicatively connected to an omnidirectional antenna, the second cellular output is communicatively connected to a directional antenna, the landline output is communicatively connected to a wired data connection that extends off the building premises, the FM spread spectrum output is communicatively connected to a spread spectrum radio and the satellite communications output is communicatively connected to a SATCOM transceiver.

14. The method of claim 13, further comprising the command center server processor transmitting instructions to one or more electric powered door locks in proximity to the first trigger device to actuate and lock.

15. The method of claim 13, further comprising the step of the command center server processor issuing push notifications to multiple individuals which are remote from the site but have relatives who are at the site.

16. The method of claim 13, wherein mobile electronic devices carried by individuals have instructions stored on mobile electronic device memories that cause the mobile electronic devices to act as trigger devices.

17. A site safety system comprising:

an onsite command center server including a command center processor coupled to a command center system bus, a command center memory coupled to the command center system bus, the command center memory being a non-transitory machine-readable storage medium configured to store instructions for execution by the command center processor, and a command center communication interface coupled to the command center system bus;

a first sensor and a second sensor spaced from one another and communicatively connected to the onsite command center server;

a multi-mode data logger communicatively connected to the onsite command center server including a data input receiving data from the onsite command center server, a first data output and a second data output, being the default route for sending the data from the data input to a data output, a multi-mode data logger processor coupled to a multi-mode data logger system bus, a multi-mode data logger memory coupled to the multi-mode data logger system bus, the multi-mode data logger memory being a non-transitory machine-readable storage medium configured to store instructions for execution by the multi-mode data logger processor, the multi-mode data logger memory containing instructions causing the multi-mode data logger processor to:

monitor available bandwidth via the first data output and the second data output, and when a bandwidth required to transmit data received from the data input exceeds the available bandwidth via the first data output, switch the route for sending data from the data input to the second data output;

a first data transmitter communicatively connected to the first data output; and a second data transmitter communicatively connected to the second data output;

wherein the multi-mode data logger further comprises a third data output, a fourth data output, and the multi-mode data logger memory further containing instructions causing the multi-mode data logger processor to monitor available bandwidth via the third data output and the fourth data output, and when the bandwidth required to transmit data received from the data input exceeds the available bandwidth via the second data output, switch the route for sending data from the data input to the third data output, and when a bandwidth required to transmit data received from the data input exceeds the available bandwidth via the third data output, switch the route for sending data from the data input to the fourth data output, wherein the first data output is one of a first cellular output and a landline, the second data output is one of the first cellular output, a second cellular output, and the landline, the third data output is one of the second cellular output and the landline, and the fourth data output is one of a FM spread spectrum output and a satellite communications output, wherein the first cellular output is communicatively connected to an omnidirectional antenna, the second cellular output is communicatively connected to a directional antenna, the landline output is communicatively connected to a wired data connection that extends off the building premises, the FM spread spectrum output is communicatively connected to a spread spectrum radio, and the satellite communications output is communicatively connected to a SATCOM transceiver.

* * * * *